No. 731,940. PATENTED JUNE 23, 1903.
R. R. OSGOOD.
FRICTION BRAKE.
APPLICATION FILED FEB. 5, 1903.
NO MODEL. 5 SHEETS—SHEET 3.
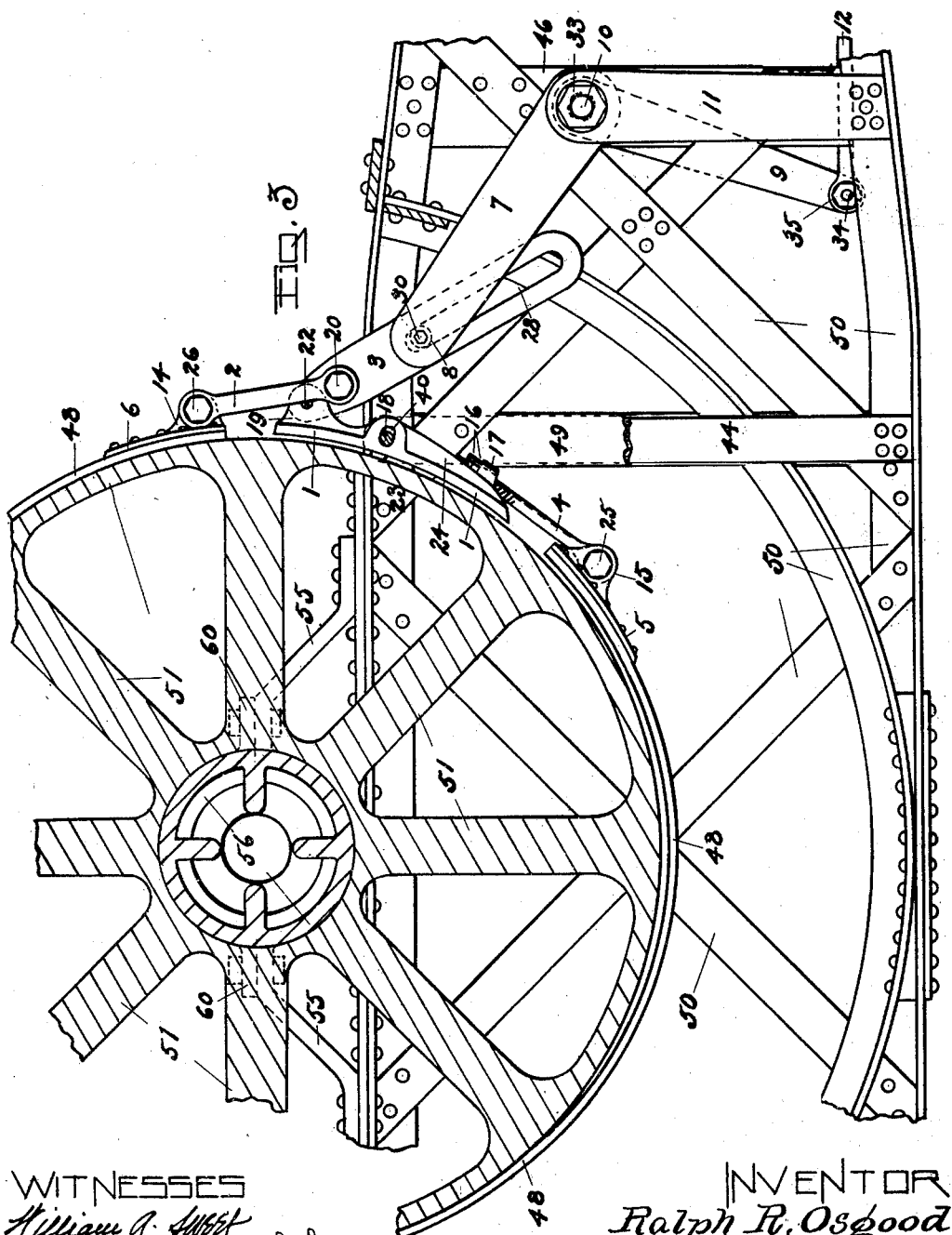
WITNESSES
William A. Sweet
Jas. A. G. Koehl.
INVENTOR
Ralph R. Osgood,
By
H. B. Willson
Attorney.

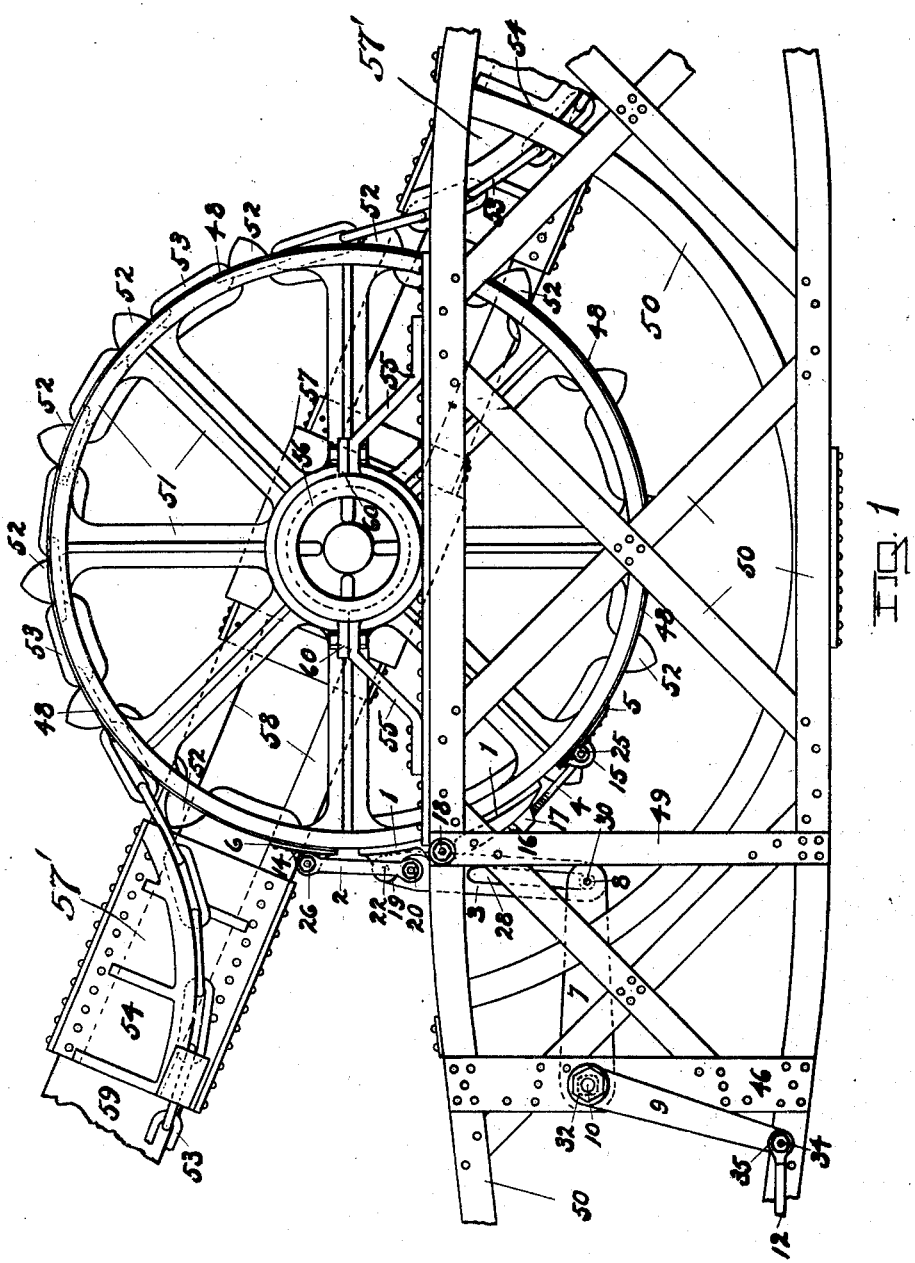

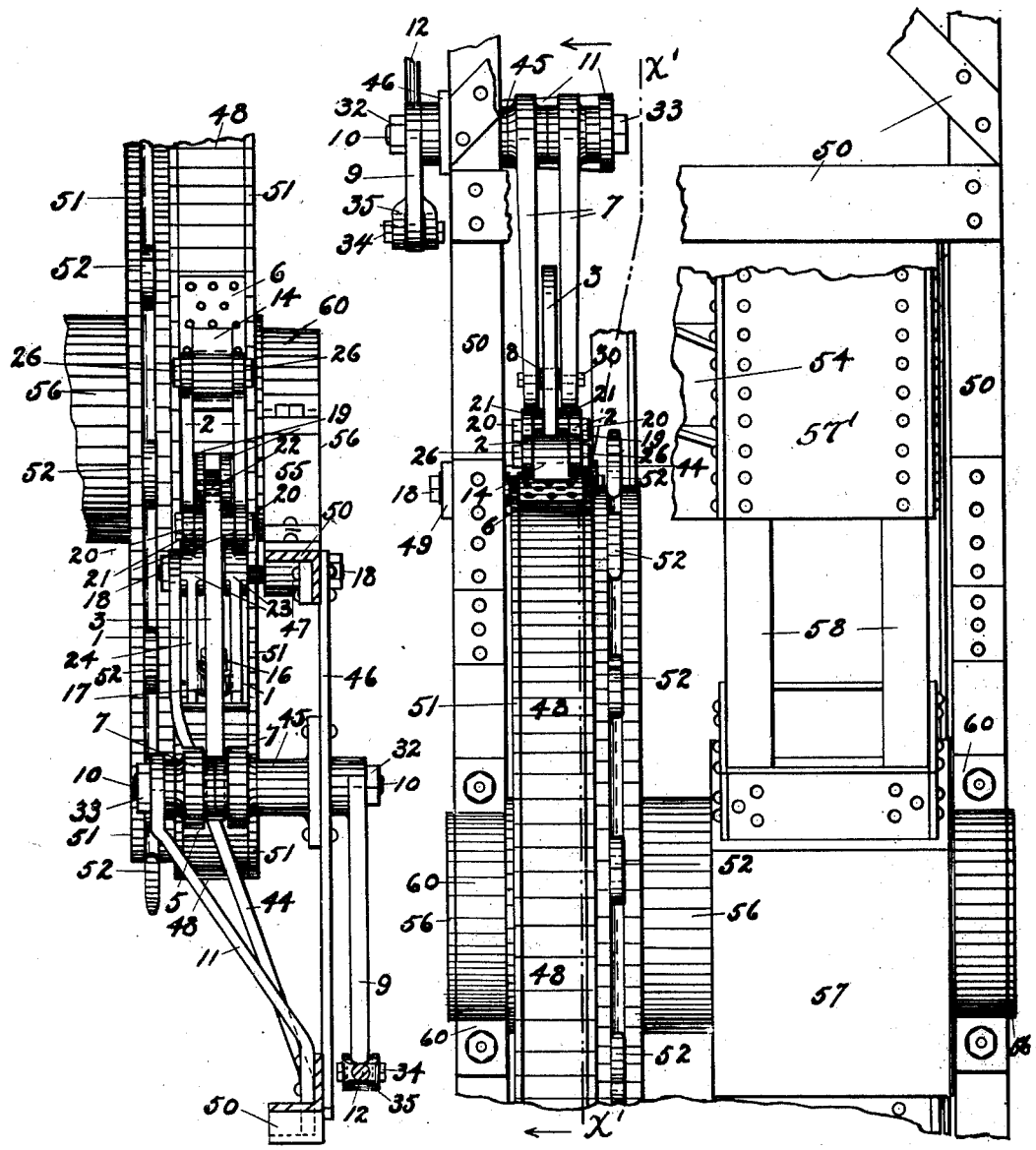

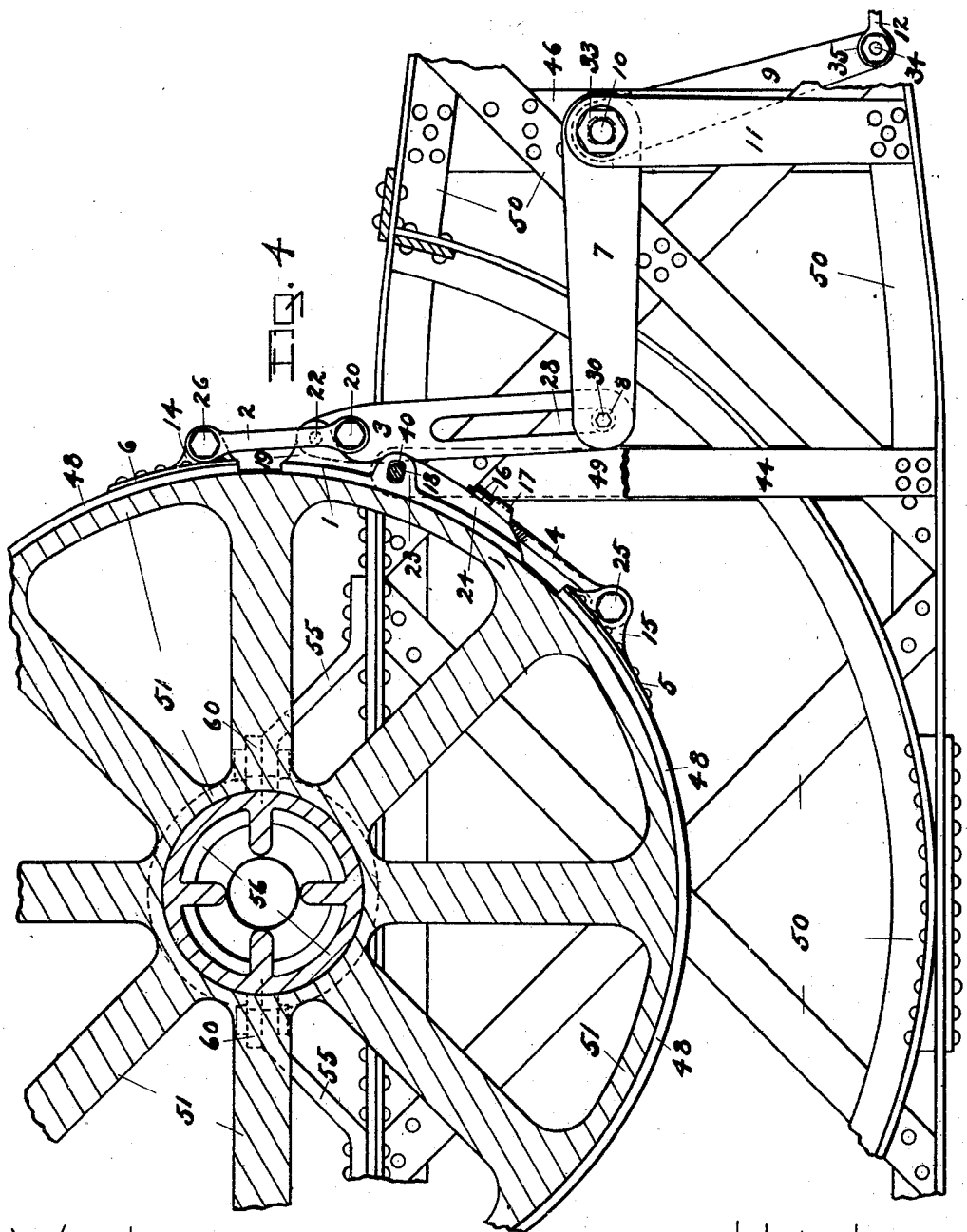

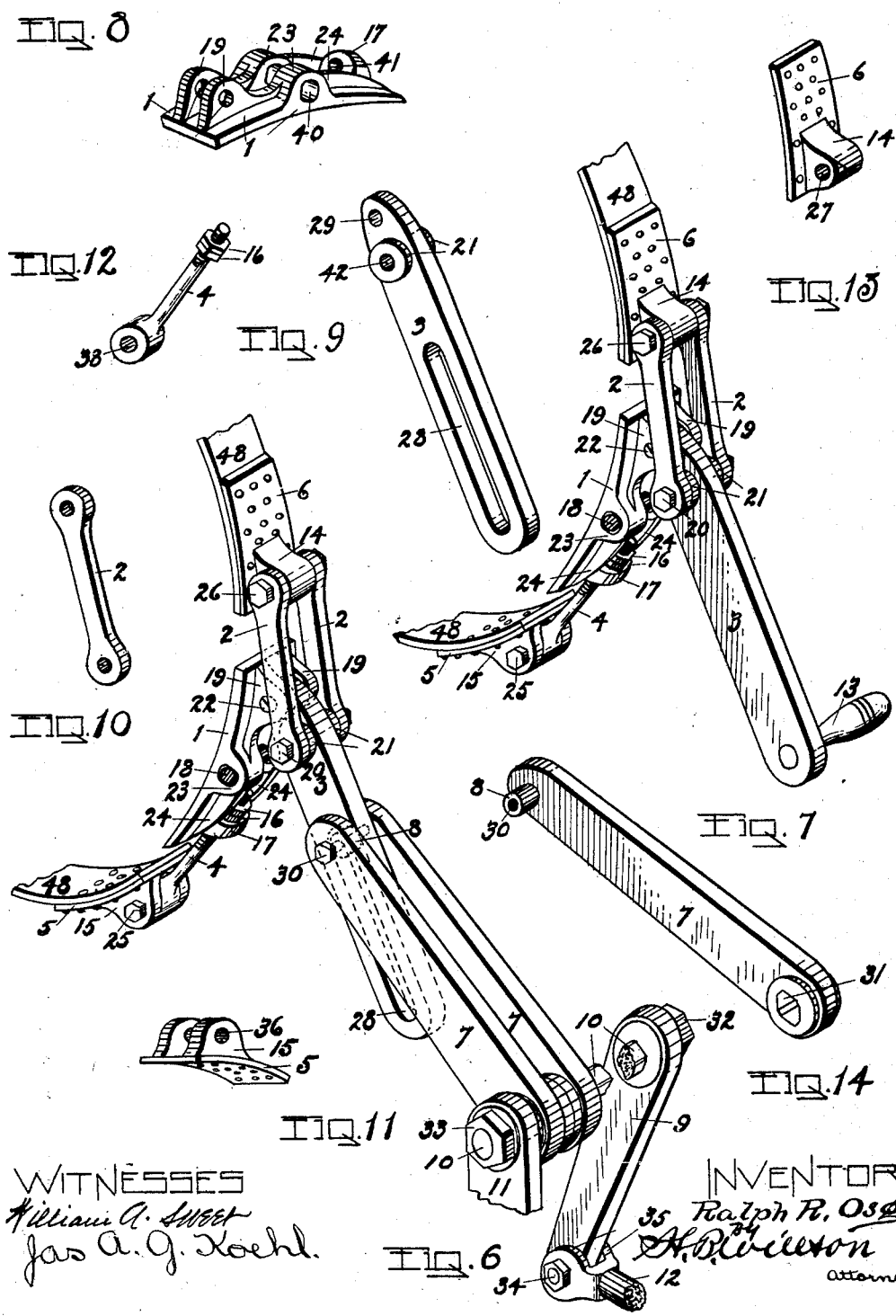

No. 731,940. Patented June 23, 1903.

UNITED STATES PATENT OFFICE.

RALPH R. OSGOOD, OF TROY, NEW YORK.

FRICTION-BRAKE.

SPECIFICATION forming part of Letters Patent No. 731,940, dated June 23, 1903.

Application filed February 5, 1903. Serial No. 142,071. (No model.)

*To all whom it may concern:*

Be it known that I, RALPH R. OSGOOD, a citizen of the United States, residing at Troy, in the county of Rensselaer and State of New York, have invented certain new and useful Improvements in Friction-Brakes; and I do declare the following to be a full, clear, and exact description of the invention, such as will enable others skilled in the art to which it appertains to make and use the same.

My invention relates to friction-brakes, and is an improvement in the type of brake mechanism shown in my prior application, filed May 9, 1902, Serial No. 106,531.

In the present construction I employ a floating lever pivotally attached to the ends of the anchored band, with the pivotal connections so arranged that when the lever is actuated to apply the band the centers of such connections will be brought to lie one in coincidence with or within the line of the other, thus forming a toggle-joint connection and one that is self-locking to hold the ends of the band drawn together and the band applied. By this means the necessity of locking the actuating mechanism is avoided and a very powerful band-applying device is produced. Also the holding power is made exactly the same in either direction of revolution of the wheel.

The essential feature of the present invention is, as will be readily understood from the foregoing statement, the provision of a toggle-jointed connection between the lever and ends of the band and the construction of such connection in such a manner as to secure an automatic locking of the ends of the band when the band is set.

In the accompanying drawings I have shown certain means for carrying my invention into practical effect without, however, intending to limit the invention to the particular construction of mechanism which for the sake of illustration I have set forth.

In the said drawings, Figure 1 is a side elevation of the brake mechanism as applied to the friction-wheel of a dredge-boom, only a part of the boom being shown. Fig. 2 is a top plan view of a portion of the friction-wheel, boom, and brake on an enlarged scale, showing the brake-band released from contact with the wheel-face. Fig. 3 is a sectional elevation on line $x'\ x'$ of Fig. 2 looking in the direction of the arrows and showing the brake released. Fig. 4 is a similar view showing the brake set. Fig. 5 is an end view of the brake and wheel in the position shown in Fig. 4. Fig. 6 is a detail perspective view of the brake mechanism disconnected from the boom, a part of the friction-band being shown. Fig. 7 is a similar view showing a different mode of operating the lever. Fig. 8 is a detail view of the brake-shoe, and Figs. 9 to 14 are similar views of parts of the brake mechanism.

Referring now more particularly to the drawings, the numeral 50 represents a support, shown in the present instance in form of a portion of the swinging boom of a dredge. This support carries bearings 55, closed by the usual caps 60 and in which is mounted a rock-shaft composed of trunnions 56, carried by a trunnion-sleeve or slideway-support 57, in which slides the dipper-handle 59. This sleeve 57 has extensions 57' connected thereto by the angle-braces 58 and provided with guides 54 for a sprocket-chain 53, which in practice is connected to the ends of the handle and coöperates with the brake mechanism to control the sliding or reciprocating movement of the handle in the said sleeve. As shown, the chain 53 engages sprocket-teeth 52 on a brake-wheel or friction-wheel 51, loosely mounted upon one of said trunnions 56, which wheel is provided with a friction-surface to be engaged by the brake-band 48. Adjustably connected to one end of this band is a brake-shoe 1, which lies between the ends of the band and is also adapted to engage the friction-surface of the brake-wheel. This connection is preferably made by applying to the said end of the band a casting 5, formed with bosses 15, between which is disposed the eye 38 of an eyebolt 4, which is pivoted thereto by a pin or bolt 25, the threaded end of the shank of the bolt being passed through an apertured boss or eye 17 on the shoe and provided with nuts 16, adjustably connecting the parts together.

The shoe 1 is reinforced by longitudinal bracing-ribs 24 and has central bosses 23, formed with oblong openings 40 to receive a pin or bolt 18, connected to the support 50, said pin or bolt serving as an anchor to hold the shoe and brake-band from circumferential movement under the drag of the wheel 51—that is, from moving around with the wheel—the oblong openings 40, however, allowing the shoe 1 to have movement radially toward and from the friction-surface of the wheel in applying and releasing the brake-band, as will be readily understood.

The construction of brake mechanism thus far described is substantially the same as that shown in my prior application, Serial No. 106,531, before referred to, and for a full disclosure of the mechanism for controlling the movements of the dipper-handle reference is to be had to my prior patent, No. 708,657, granted September 9, 1902. The friction-wheel in the present instance serves the combined function of a drum and brake-wheel, and the chain 53 takes the place of the straps 13 14 in said patent to limit the sliding or reciprocatory movement of the dipper-handle in the trunnion-sleeve, the brake-band when applied serving to prevent independent motion of the friction-wheel to lock the handle at any desired point in its reciprocating path, so as to allow said handle to be oscillated in a vertical path on the axes of the trunnions by the dipper-operating mechanism.

I have shown the application of the invention to the dipper-operating mechanism of a dredge simply for the purpose of illustrating one mode of use of the invention, and I desire it understood that I do not limit it to this or any other particular mode of use, since the "brake mechanism," so called for convenience of description, may be employed to arrest the motion of an oscillating or rotating wheel of any type of machinery and may also be employed as a friction-clutch to connect parts to transfer movement from one to the other.

To the opposite end of the band 48 is attached a casting 6, having a boss 14, provided with a transverse hole 27, through which passes a bolt 26. Pivoted at one end upon this bolt are a pair of spaced links 2, which are connected at their opposite ends to a floating operating-lever 3 by a bolt 20, passing through an aperture 21, formed in said lever adjacent to its inner end. At its inner end the lever is formed with an aperture 29, through which passes a pivot pin or bolt 22, by which the lever is connected to ears 19 on the adjacent or upper end of the shoe 1. These ears 19 project outward some little distance from the outer face of the shoe and are adapted when the links 2 are swung inward, as shown in Fig. 4, to lie between the links, which latter accordingly form an open swinging frame adapted to receive the said ears.

By the described construction of connections between the shoe, lever, and ends of the band it will be observed that the shoe in effect forms a part of the band, and thus the floating lever is pivotally connected to both ends of the band in such manner that when said lever is moved to a substantially vertical position, as shown in Fig. 4, the ends of the band will be drawn together and the band brought into frictional engagement with the brake-wheel, and that, on the other hand, when the lever is swung out to the substantially diagonal position shown in Fig. 3 the ends of the band are allowed to spread apart, thus releasing the band from engagement with the wheel. As the lever swings inward on the fulcrum-bolt 22 the bolt 20 moves therewith in an arc concentric with the bolt 22 and accordingly not only swings the links 2 inward, but draws them downward, thus giving a powerful "toggle action," by which the shoe 1 is moved into contact with the wheel and the end of the band to which the casting 6 is connected is drawn down to contract the band about the wheel. In such movement also the parts 19 and 20 fold one within the other and the bolt 20 is brought to lie in coincidence with or inside of the line of the bolt 22, as shown in Fig. 4, from which it will be observed that as the pivotal centers of the connections are brought into register the ends of the band are automatically locked in braking position simultaneously with the application of the band to the wheel, thus obviating the necessity of locking the lever 3 or holding it in applying position. By anchoring the band to the support by the bolt 18 the necessity of using a part of the power applied to the lever 3 to overcome movement of the band under the drag of the wheel is avoided. Hence all the applied power is employed to set the brake, and at the same time the braking power of the band on the wheel is made the same in either direction of oscillation or revolution of the wheel. When the lever 3 is swung outward, the pivotal centers are moved out of alinement and the links 2 swung outward and upward, thus allowing the band to expand and release the wheel.

The lever 3 may be operated by hand-pressure or power appliances, as desired. In Fig. 13 I have shown the lever provided with a handle 13, by means of which it may be actuated by hand, and in the remaining figures I have shown mechanical devices (illustrated in detail in Fig. 6) by means of which the lever may be actuated from a suitable source of power. In this latter construction the lever is provided with a longitudinal slot 28, receiving a friction-roller 8 on a cross-bolt 30, connecting the adjacent ends of two links 7, lying on opposite sides of the lever, the opposite ends of the links being provided with polygonal openings 31 for passage of a rock-shaft 10, similarly shaped in cross-section, whereby the links are fitted upon the shaft to turn therewith and to act as cranks upon the lever 3. This shaft is mounted in a bearing 45 upon a standard 46 on the support 50 and at its opposite end in a brace 11, secured to the support and is threaded at each end for the reception of nuts 32 33. Similarly fitted upon the shaft and held in position by one of said nuts is a crank-arm 9, which is connected at its free end to a yoke 35 on a connecting-rod 12 by a pivot-bolt 34. Upon reciprocating the rod 12 in one direction or the other it will be apparent that proper swinging motion will be imparted to the lever 3 to apply and release the brake-band, the friction-roller 8 traveling in the slot 28 to compensate for the swing of the lever. The rod 12 may be actuated by a piston or power appliance of any approved kind.

One end of the bolt 18 is mounted in a casting 47, bolted or riveted to the support 50, and the other end is supported by a brace 49.

From the foregoing description, taken in connection with the accompanying drawings, the construction, mode of operation, and advantages of my invention will be readily apparent, it is thought, without requiring a more extended explanation.

Various changes in the form, proportion, and the minor details of construction may be resorted to without departing from the principle or sacrificing any of the advantages of the invention.

Having thus described my invention, what I claim as new, and desire to secure by Letters Patent, is—

1. In a friction-brake, a brake-band, a swinging, floating, operating-lever, and pivotal connection between the ends of the band and lever adapted to have their centers fold one within the other when the ends of the band are drawn together forming an automatic lock to hold the band applied.

2. In combination with a support and a brake-wheel, a brake-band, a brake-shoe applied to one end of the band and anchored to the support, and a toggle-joint connection between the lever, shoe and other end of the band.

3. In combination with a support and brake-wheel, a brake-band anchored to the support, a floating lever pivoted to one end of the band, and spaced links connecting the other end of the band to the lever, and forming an open swinging frame.

4. In combination with a brake-wheel, and a support, a brake-band to engage the wheel, a floating lever for applying the band, means independent of the lever for anchoring the band to the support, and a toggle-joint connection between the lever and ends of the band, substantially as described.

5. In a friction-brake, a support, a brake-wheel, a brake-band to engage the wheel, a brake-block anchored to the support and connected to one end of the band, and a floating lever having a toggle-joint connection with the block and other end of the band.

6. In a friction-brake, the combination with a support, and a brake-wheel, of a brake-band anchored at one end of the support, a swinging floating lever pivotally connected with the anchored end of the band, and a link pivotally connected to the other end of the band and the lever, thus forming a toggle-joint, the pivotal connections of said joint being so related that the swinging movement of the lever automatically makes and breaks a self-locking engagement between the parts of the joint.

7. In a friction-brake, a brake-wheel, a brake-band, an operating-lever, and interfolding self-locking members pivotally connecting the lever to the ends of the band.

8. In a friction-brake, the combination with a suitable support, and a brake-wheel, of a brake-band anchored to the support and provided at one end with a locking member, a band-applying lever, and a second locking member connected to the lever and other end of the band and adapted, when the lever is operated, to engage and disengage the first-named locking member, substantially as described.

9. In a friction-brake, the combination with a suitable support, and a brake-wheel, of a brake-band anchored to the support and provided at one end with a locking member, a swinging floating band-applying lever, and a swinging locking member connected to the lever and other end of the band and adapted, when the lever is operated, to be swung into and out of locking engagement with the first-named locking member, substantially as described.

10. A brake-band having at one end an off-standing boss, a floating lever pivoted to the boss, and an open swinging frame pivoted to the lever and other end of the band and adapted to receive the boss when swung by the lever to draw together the ends of the band, whereby the pivotal connection of the frame with the lever is adapted to lie within the line of the pivotal connection between the boss and lever, thus locking the ends of the band.

11. In combination with a brake-wheel, and a support, a brake-band anchored at one end to the support, a floating lever pivoted to one end of the band, and an open swinging frame pivoted to the lever and other end of the band and forming a toggle-joint connection therewith, the parts of which are adapted to fold one within the other when the lever is actuated to apply the band, substantially as described.

12. In combination with a brake-wheel, and a support, a brake-band anchored at one end to the support, a floating lever pivoted to one end of the band, an open swinging frame pivoted to the lever and other end of the band and forming a toggle-joint connection therewith, the parts of which are adapted to fold one within the other when the lever is actuated to apply the band, a crank having a slot-and-pin connection with the lever, and means for actuating said crank, substantially as described.

In testimony whereof I have hereunto set my hand in presence of two subscribing witnesses.

RALPH R. OSGOOD.

Witnesses:
CORNELIUS A. WALDRON,
FRANK A. WALDRON.